No. 859,565. PATENTED JULY 9, 1907.
M. LEITCH.
APPARATUS FOR DETINNING TIN SCRAP
APPLICATION FILED FEB. 17, 1906.
3 SHEETS—SHEET 2.
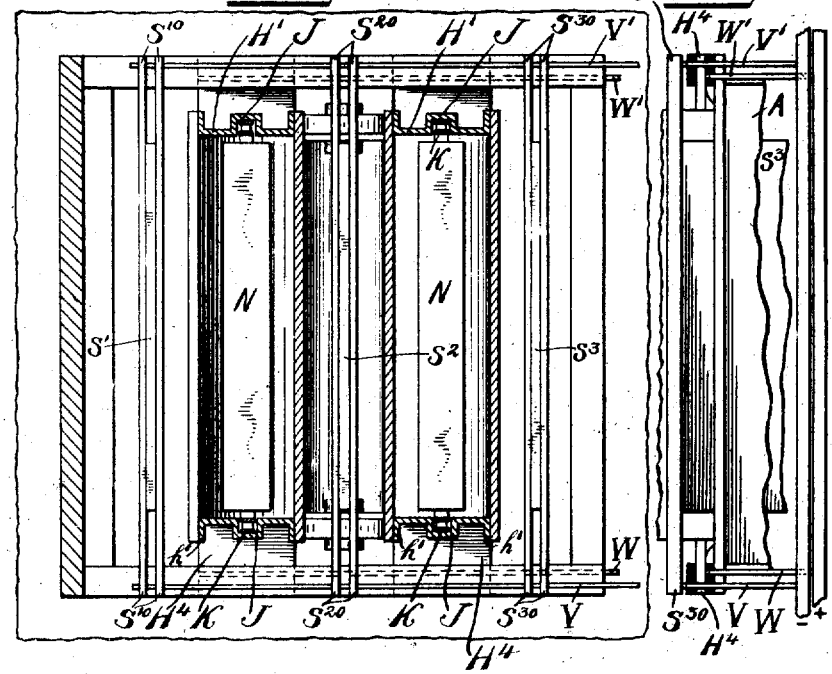
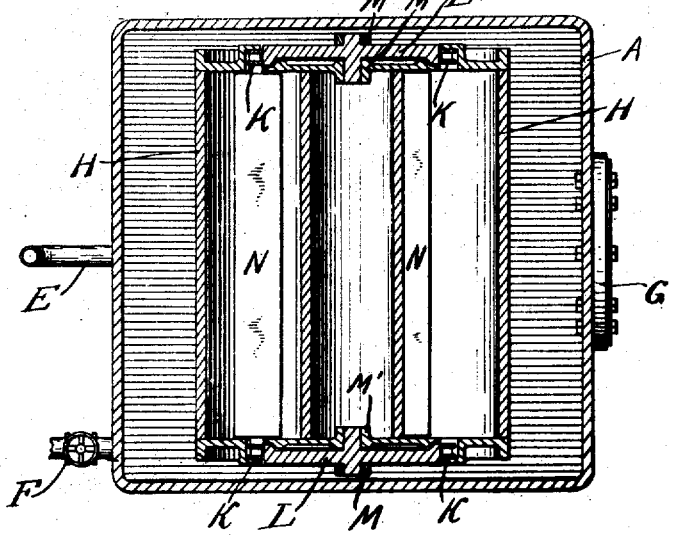
Witnesses
Inventor
MEREDITH LEITCH
By his Attorneys

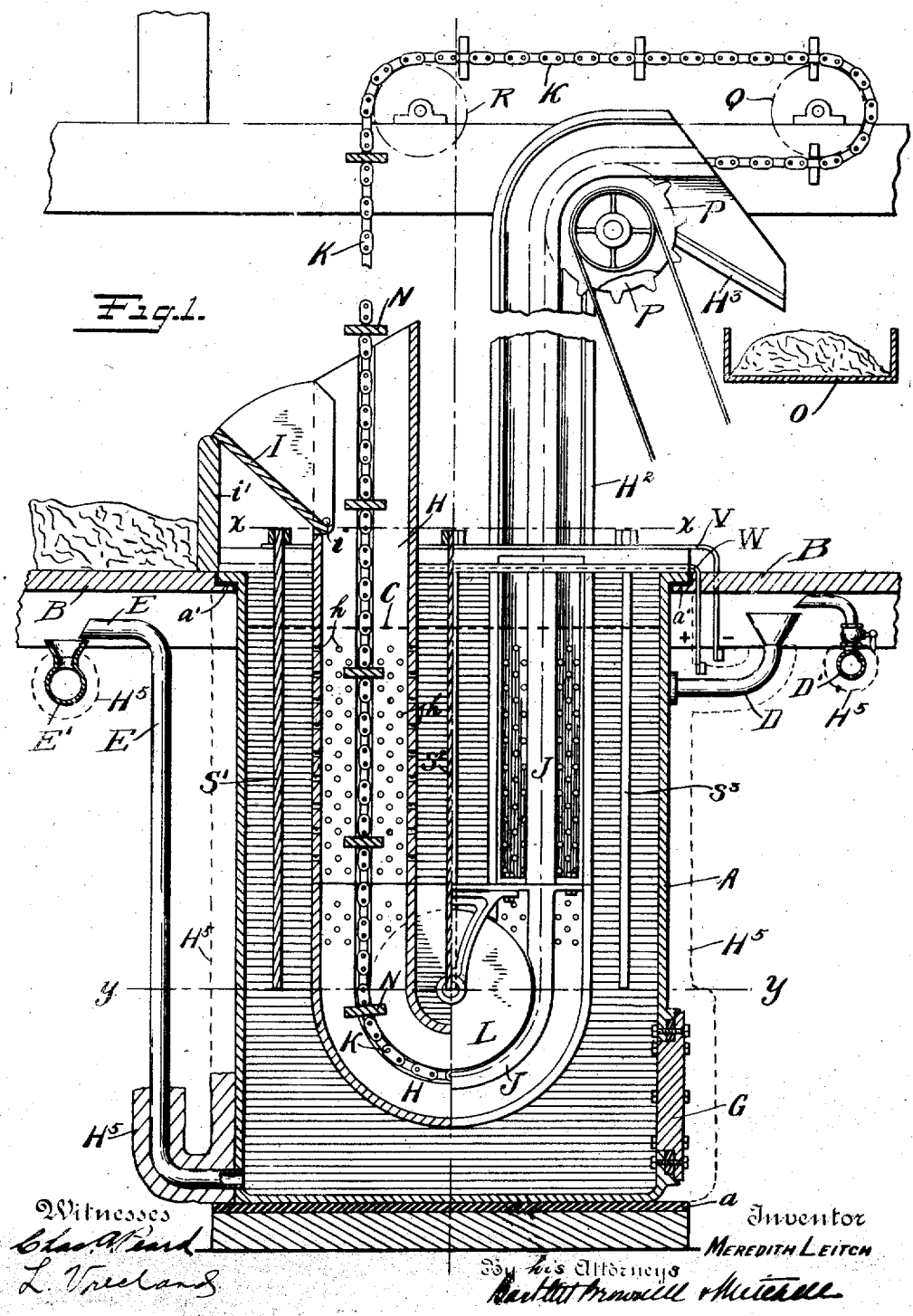

UNITED STATES PATENT OFFICE.

MEREDITH LEITCH, OF ELIZABETH, NEW JERSEY, ASSIGNOR TO AMERICAN CAN COMPANY, OF JERSEY CITY, NEW JERSEY, A CORPORATION OF NEW JERSEY.

APPARATUS FOR DETINNING TIN-SCRAP.

No. 859,565. Specification of Letters Patent. Patented July 9, 1907.

Application filed February 17, 1906. Serial No. 301,585.

*To all whom it may concern:*

Be it known that I, MEREDITH LEITCH, a citizen of the United States, residing at Elizabeth, Union county, New Jersey, have invented certain new and useful Improvements in the Apparatus for Detinning Tin-Scrap, of which the following is a full, clear, and exact description.

My invention relates to improvements in apparatus for removing the tin coating from scrap tin, including tin cuttings, tin cans, and the like.

In detinning plants as now constituted, scrap tin is usually deposited in baskets which are then immersed in electrolytic baths, there subjected to the action of an electric current, and subsequently removed by hand or by hoists of some suitable construction, after which the detinned or black scrap is immersed in wash tanks; the apparatus requiring for the handling of the scrap during this process hoists, baskets, tanks, cars, trucks and turn-tables, and manual labor at the various stages.

The object of my invention is to produce an efficient apparatus which shall be continuous in its operation and shall eliminate all manual labor in the detinning process, except that required to feed the scrap into a hopper and collect the tin powder from the cathode plates.

It further has for its object to reduce the cost of the electrolyte by thorough draining of the scrap and by thorough washing, and to reduce the cost of regenerating the electrolyte by reducing its exposure to the atmosphere, thus preventing the absorption of carbonic acid.

It further has for its object to reduce the cost of electric energy by providing better electrical connections and more effective working relations and a lower resistance between the elements of the bath.

It further has for its object to reduce the cost of fuel for heating the electrolyte by providing apparatus which can be thoroughly and permanently protected against loss of heat and which has a comparatively small exposed surface.

It further has for its object to effect a more complete detinning by subjecting the scrap in one bath to the same conditions of current strength and heat and almost uniform position with relation to flow of the electric current and electrolyte.

It further has for its object to produce an easily collectible tin powder almost free from foreign matter by depositing it only upon removable cathode plates, the refuse being allowed to precipitate to the bottom of the tank.

Figure 5:
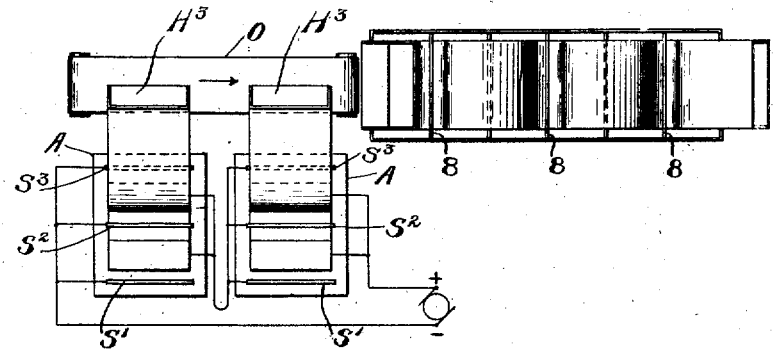
Figure 6:
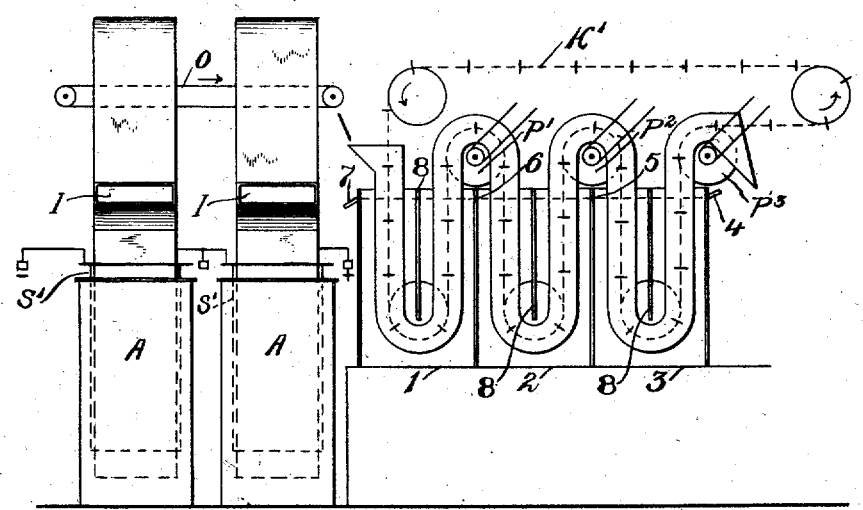

The following is a description of the apparatus embodying my invention, reference being had to the accompanying drawings, in which Figure 1 shows my apparatus partly in vertical section and partly in side elevation. Fig. 2 represents a horizontal section of the same on the line $x-x$ Fig. 1. Fig. 3 represents an end elevation with parts broken away. Fig. 4 represents a horizontal section of the apparatus on the line $y-y$, Fig. 1. Figs. 5 and 6 represent diagrammatically in plan and side elevation the system embodying the electrolytic and washing baths.

Referring more particularly to the drawings, A represents a tank, preferably of iron, designed to rest on the floor or the floor of a pit, and electrically insulated at $a a'$ so as to remain neutral with reference to the electric circuit hereinafter described, even when that circuit is grounded. The top of the tank is about level with the floor B of the tin scrap room. The tank A contains the electrolyte C, which is preferably a solution of caustic soda, heated to about 75° centigrade, such as has heretofore been used in electrolytic detinning. The tank A is provided with an inlet D and an outlet E, and supply and return pipes $D'$ and $E'$ disconnected or otherwise insulated therefrom for the circulation of the heated electrolyte. There is also a draw-off pipe F at the bottom of the tank for completely emptying the same, and a clean-out door G for removing the precipitated waste. Within this tank there is a stationary receiver H, which, in its preferred form, is a U-shaped basket or tube, as shown, preferably of iron, which is to receive and support the tin scrap. This U-shaped basket is provided at the left-hand side with a hopper I into which the tin scrap is fed.

The sides of the basket or tube are made of sheet metal, perforated as at $h$. The curved bottom is made of sheet metal, but is imperforate so as to prevent the sifting out of particles that may be present. The ends $H'$ are preferably of perforated cast metal having flanges $h'$ to which the perforated sides of the basket H are secured in such a way as to avoid any roughness on the inside of the tube or basket. These ends are provided with raised portions J in which are formed grooves to receive conveyer chains K. The grooves at the lower part of the tube are curved as shown at $J'$ and the inner curved surfaces of the grooves are formed by smooth-rimmed wheels L mounted on the outside of the tube or basket H, but having their rims projecting through slots in the castings in such a way that the rims of the wheels form the inner curved surfaces of the grooves, thus providing means for turning and guiding the chains around the curve without any friction and without catching the tin scrap. The wheels L are mounted in suitable bearings $M-M'$ carried by the basket H. Fastened to the chains are T-bars $N-N$, which, when the chains are in motion, serve to convey the scrap down and up through the U-shaped basket and through an imperforate upward extension $H^2$ of the tube and over the top to the discharge chute H³, from which the scrap will glide by gravity into the black scrap conveyer O.

The conveyer O is designed to receive the detinned or black scrap from a number of baths as they discharge, and deliver it to a washer or series of washers similar in construction to the detinning bath, or to such point as may be desired. In passing to the discharge chute the conveyer chains pass over sprocket wheels P, which project through slots in the castings in the same manner as do the wheels L and thus form the inner curved surfaces of the grooves at the points where they are located. The sprocket teeth engage the chains and impart motion thereto, power being supplied from any suitable source. The conveyer chains, after leaving the discharge chute, pass over idlers Q and R, supported on wooden beams or otherwise insulated, and then return to the U-shaped basket H. Immersed in the electrolyte within the tank are three cathodes, S', S² and S³, preferably of iron, which are provided with extensions S¹⁰ S²⁰ and S³⁰, which rest upon conductors V V' connected to the negative pole of a source of electricity. The cathodes S', S² and S³ can thus be removed and replaced by simply lifting them out of the tank without disturbing the other parts, the upper extensions H³ being at least long enough so that there will be nothing to interfere with the removal of the cathode S³. The hopper I is hinged at $i$ so that it can be turned up out of the way of the cathode S'. Normally it rests against the upright $i'$ of wood or other poor conducting material. The basket H is permanently electrically connected by the supporting lugs H⁴ to the conductors W W', and the positive pole of the source of electricity so that its contents form the anode in the electrolytic cell.

In Figs. 5 and 6, A A are detinning baths discharging tinned or black scrap into the conveyer O. The discharge into the conveyer is slow and, if not steady, is at frequent intervals. The conveyer carries the detinned scrap to the washers 1, 2, 3, each of which has a basket similar to that in the bath A (Fig. 1). The neighboring washing baskets are connected and through all of them runs a common conveyer K (shown only in Fig. 6). Power is applied to the conveyer as it comes from each washing basket through the wheels P' P² P³. The tanks of the baths 1, 2, 3, are supplied with running water, fed to the last tank at 4, and flowing through the washing tanks in the opposite direction to the movement of the black scrap until it flows through connections 5 and 6 and out of the first tank at 7. Each washing tank is provided with a diaphragm 8 extending clear across and as near to the bottom as the basket or tubes will permit, so as to direct the flow of the water. By having the water flow in the opposite direction to the movement of the scrap, the scrap first meets water containing a considerable percentage of the electrolyte and as it advances meets water which is more and more pure until just before it leaves the washing tank it passes through substantially pure water. The tin scrap is in this way detinned and washed without manual labor other than that necessary to feed it into the hoppers I.

It is to be noted that there is no electrical contact between the discharge chute H³ and the conveyer O or the material on the conveyer O, since this conveyer moves fast enough to prevent the material piling up so as to touch the chute H³, and further, that the conveyer for the electrolytic apparatus is electrically separate from the washing apparatus. The basket H is therefore protected against any but accidental grounding through the chute or conveyer as well as at other points. This is of particular importance where the electrolytic apparatus are electrically in series and mechanically in multiple as shown in Fig. 5, which is the preferred arrangement.

In operating the apparatus, a caustic soda solution heated to about 75° centigrade is caused to circulate through the tank A. The tin scrap is then fed into the hopper I sufficiently fast so that the basket when once filled is kept full. The conveyer chain K is then operated through the sprocket wheels P with either a steady or a periodic movement, so that a substantially continuous mass of scrap within the tank is subjected to electrolytic action for a period sufficient to remove all the tin therefrom. When the cathodes S', S² and S³ are sufficiently coated with tin sponge, they are removed from the tank and the tin sponge removed therefrom in any suitable manner. The construction of the tank and of the cathodes permits the substitution of a fresh cathode whenever one is removed. As the conveyer chains with the T-bars move, the scrap as it leaves the bath is permitted to drain to a greater or less degree according to the length of the upper extension H² and the rate of movement of the chains. In this way the greater part of the electrolyte flows immediately back to the tank A. The form of the apparatus results in a comparatively slight exposure of the electrolyte to the air, and at the same time permits it to be easily surrounded by a non-conductor of heat. When the tank is so surrounded, as well as the pipes conducting the electrolyte to and from the same, as indicated at H⁵, the loss of heat by radiation is reduced to a minimum. The permanent electric connections and electro-chemical relations of the elements in the bath are such as to make the resistance comparatively low, and thus save electrical energy. Scrap is removed as fast as it is detinned, and fresh scrap is simultaneously introduced, so that the resistance of the bath and the working conditions are always substantially the same. The scrap which passes through the bath is all subjected to the same conditions of current and heat, being almost uniform in position with relation to the flow of electrical current and electrolyte. Moreover, the scrap in going through the basket is turned upside down, permitting the escape of any confined air, and also a more complete circulation of the electrolyte. The scrap, when the tin has been removed, is carried to the washers. Moreover, the scrap is inverted or reversed in position while passing through each washing tank and is also inverted or reversed in position while passing through the air in going from one washing tank to another. The emptying of the cans between each bath insures a more complete washing of their interiors.

The apparatus is simple, and the parts can be made of such proportions as to easily stand all the strain necessary, and moreover, in the normal operation is not subject to very hard usage. This results in small cost for repairs and small danger of interruption of the work. The tin powder or sponge is deposited upon the cathode plates only, the tank itself being neutral. The refuse falls to the bottom of the tank and is therefore free from tin powder, except as the same may be dislodged from the cathodes.

My invention permits of various modifications, both in form and in materials used, such as would suggest themselves to those skilled in the art. The apparatus which I have shown and described is, however, the form preferred by me.

The method herein described is claimed in a divisional application filed by me on the 20th day of April, 1906, Serial No. 312,759.

What I claim is:

1. In an electrolytic detinning apparatus, the combination of a tank, a stationary receiver composed of conducting material insulated from said tank and adapted to be submerged in an electrolyte, means for continuously feeding tin scrap to said receiver, and automatically removing detinned scrap therefrom, a source of electricity to one terminal of which said receiver is connected independently of said scrap so as to constitute an anode, and a cathode connected to the other terminal of said source, said receiver having on its inside an exposed metallic surface with which said scrap makes a moving electrical contact.

2. In an electrolytic detinning apparatus, the combination of a tank for containing the electrolyte, with a stationary metallic basket in said tank for containing the tin scrap, said basket being insulated from said tank, means for conveying or advancing the tin scrap through the basket, an electrode in the tank and a source of electricity having its terminals respectively connected to said electrode and independently of said scrap to said basket, said basket having on its inside an exposed metallic surface with which said scrap makes a moving electrical contact.

3. In an electrolytic detinning apparatus, the combination of a tank, for containing the electrolyte, with a stationary metallic basket in said tank for containing the tin scrap, said basket being insulated from said tank, means for conveying or advancing the tin scrap through the basket, removable cathode plates in the tank and a source of electricity having its terminals respectively connected to said cathode plates and independently of said scrap to said basket, said basket having on its inside an exposed metallic surface with which said scrap makes a moving electrical contact.

4. In an electrolytic detinning apparatus, the combination of a tank for containing the electrolyte, with a stationary metallic basket in said tank for containing the tin scrap, said basket being insulated from said tank, means for conveying or advancing the tin scrap through the basket, an electrode in the tank and a source of electricity having its terminals respectively connected to said electrode and independently of said scrap to said basket, said tank being insulated or neutral in respect to the electric circuit, so that its walls will not act as cathodes for deposit of tin sponge, said basket having on its inside an exposed metallic surface with which said scrap makes a moving electrical contact.

5. In an electrolytic detinning apparatus, the combination of a tank for containing the electrolyte, with a stationary metallic basket in said tank for conveying the tin scrap, said basket being insulated from said tank, means for conveying or advancing the tin scrap through the basket, an electrode within said tank and a source of electricity having its terminals respectively connected to said electrode and independently of said scrap to said basket, said basket having perforate sides and imperforate bottom, said basket having on its inside an exposed metallic surface with which said scrap makes a moving electrical contact.

6. In an electrolytic detinning apparatus, the combination of a tank for containing the electrolyte, with a stationary metallic basket in said tank for containing the tin scrap, said basket being insulated from said tank, means for conveying or advancing the tin scrap through the basket, an electrode in the tank and a source of electricity having its terminals respectively connected to said electrode and independently of said scrap to said basket, and means for returning back into the tank the liquid dripping from the scrap after it leaves the tank, said basket having on its inside an exposed metallic surface with which said scrap makes a moving electrical contact.

7. In a detinning apparatus, the combination of a tank for containing the electrolyte, with a stationary metallic basket in said tank for containing the tin scrap, said basket being insulated from said tank, a conveyer for advancing the tin scrap in and through the basket, a removable cathode plate in said tank, a source of electricity having its terminals respectively connected to said basket, independently of said scrap and to said cathode plate, said basket having on its inside an exposed metallic surface with which said scrap makes a moving electrical contact.

8. In a detinning apparatus, the combination of a tank, a tubular U-shaped basket contained therein, and a flexible conveyer passing through said basket, said tank being adapted to contain a liquid for treating the contents of said basket.

9. In a detinning apparatus, the combination of a tank, a tubular U-shaped basket of conducting material contained therein, and a flexible conveyer passing through said basket, said tank being adapted to contain a liquid for treating the contents of said basket, an electrode located within said tank and a source of electricity having its terminals respectively connected to said electrode and said basket.

10. In a detinning apparatus, the combination of a tank, a tubular U-shaped basket of conducting material contained therein, and a conveyer passing through said basket, said tank being adapted to contain a liquid for treating the contents of said basket, an electrode located between the upright arms of said basket, and a source of electricity having its terminals respectively connected to said electrode and said basket.

11. In a detinning apparatus, the combination of a tank, a tubular U-shaped basket of conducting material contained therein, and a flexible conveyer passing through basket, said tank being adapted to contain a liquid for treating the contents of said basket, electrodes on each side of said basket and between the upright arms thereof, and a source of electricity having its terminals respectively connected to said electrodes and to said basket.

12. In a detinning apparatus, the combination of a tank, a tubular U-shaped basket contained therein, and a flexible conveyer passing through said basket, said tank being adapted to contain a liquid for treating the contents of said basket, and an upward extension rising on the delivery side of said basket.

13. In a detinning apparatus, the combination of a tank, a tubular U-shaped basket contained therein, a conveyer passing through said basket, said tank being adapted to contain a liquid for treating the contents of said basket, an upward extension rising on the delivery side of said basket, and guiding and driving wheels for said conveyer, the driving wheels being located near the upper end of said extension.

14. In a detinning apparatus, the combination of a tank, a tubular U-shaped basket contained therein, a conveyer passing through said basket, said tank being adapted to contain a liquid for treating the contents of said basket, and an upward extension rising on the delivery side of the basket.

15. In a detinning apparatus, the combination of a tank for containing the electrolyte, with a metallic basket in said tank for containing the tin scrap, a conveyer for advancing the tin scrap in and through the basket, a cathode plate in said tank, a source of electricity having its terminals respectively connected to said tank and to said cathode plate, said basket having on its inside an exposed metallic surface with which said scrap makes a moving electrical contact, a washing tank, a conveyer for passing the scrap through said washing tank, and means for automatically delivering the scrap from the conveyer of the detinning tank to the conveyer of the washing tank.

16. In a detinning apparatus, with a combination of a tank for containing the electrolyte, with a basket in said tank for containing the tin scrap, a conveyer for advancing the tin scrap in and through the basket, a cathode plate in said tank, a source of electricity having its terminals respectively connected to said basket independently of said scrap and to said cathode plate, said basket having on its inside an exposed metallic surface with which said scrap makes a moving electrical contact, a washing tank, a conveyer for passing the scrap through said washing tank and a conveyer for delivering the scrap from the conveyer of the detinning tank to the conveyer of the washing tank.

17. In an apparatus for detinning tin scrap, the combination of a tank containing the electrolyte, with means for receiving and confining the scrap and advancing it through the tank in a substantially continuous mass, a cathode plate in said tank, said confining means being constructed of a conducting material and insulated from said tank and having an interior metallic surface adapted to make electrical contact with the scrap contained therein, and a source of electricity having its terminals respectively connected to said receiving and confining means, independently of said scrap and also to said cathode plate.

18. In a detinning apparatus, the combination with a tank for containing the electrolyte, of a tubular basket of conducting material for receiving and confining the scrap while in said tank, said basket being insulated from said tank, means for conveying or advancing the scrap through the tank while contained or confined by said basket, a cathode plate in said tank, a source of electricity having its terminals respectively connected, independently of said scrap to said basket and to said cathode plate, substantially as specified.

19. In a detinning apparatus, the combination of a source of electric current, a plurality of electrolytic detinning baths, each having an anode consisting of tin scrap and a cathode and arranged electrically in series with said source, a common receiving means, and a plurality of tubular shaped baskets and conveyers arranged in multiple for passing continuous masses of the said tin scrap constituting the anode through said baths and delivering the same to said common receiving means, the several baskets and conveyers for passing the scrap through said baths being each electrically insulated from every other basket and conveyer.

20. In a detinning apparatus, a combination of a U-shaped basket, a conveyer therein having projections extending through the sides thereof at the curved portion of said basket, pulleys located on the outside of said basket at the curved portion thereof, and engaging with the extending portions of said conveyer and means for driving said conveyer.

21. In a detinning apparatus, the combination of a U-shaped basket having in two opposite sides sunken grooves, a conveyer having flexible members adapted to run in said grooves and bars passing through the center of said basket and joining said members, and means for moving said conveyer.

22. In a detinning apparatus, the combination of a tank, a U-shaped basket therein having perforated sides but an imperforate bottom, and a conveyer within said basket and means for moving said conveyer.

MEREDITH LEITCH.

Witnesses:
H. B. BROWNELL,
L. VREELAND.